(12) United States Patent
Martinelli et al.

(10) Patent No.: US 7,209,607 B2
(45) Date of Patent: Apr. 24, 2007

(54) OPTICAL SPACE-SWITCHING MATRIX

(75) Inventors: Mario Martinelli, San Donato Milanese (IT); Andrea Paganini, Piacenza (IT); Silvia Maria Pietralunga, Cassina de Pecchi (IT); Andrea Zappettini, Reggio Emilia (IT)

(73) Assignee: Pirelli & C. S.p.A., Milan (IT)

( * ) Notice: Subject to any disclaimer, the term of this patent is extended or adjusted under 35 U.S.C. 154(b) by 54 days.

(21) Appl. No.: 10/497,009

(22) PCT Filed: Nov. 30, 2001

(86) PCT No.: PCT/EP01/13996

§ 371 (c)(1),
(2), (4) Date: Oct. 27, 2004

(87) PCT Pub. No.: WO03/047304

PCT Pub. Date: Jun. 5, 2003

(65) Prior Publication Data

US 2005/0041911 A1 Feb. 24, 2005

(51) Int. Cl.
*G02B 6/26* (2006.01)
(52) U.S. Cl. ............................. 385/17; 385/7
(58) Field of Classification Search .................... None
See application file for complete search history.

(56) References Cited

U.S. PATENT DOCUMENTS

| | | | |
|---|---|---|---|
| 3,602,577 A * | 8/1971 | Byram ........................ 359/313 |
| 3,871,743 A * | 3/1975 | Fulenwider .................. 385/17 |
| 4,624,534 A * | 11/1986 | Amano ........................ 359/310 |
| 4,995,693 A | 2/1991 | Wilson |
| 5,457,556 A | 10/1995 | Shiragaki |
| 5,581,643 A | 12/1996 | Wu |
| 5,852,688 A | 12/1998 | Brinkman et al. |
| 5,909,304 A | 6/1999 | Chang |
| 6,016,216 A | 1/2000 | Chang |
| 6,049,641 A | 4/2000 | Deacon et al. |

FOREIGN PATENT DOCUMENTS

WO  WO 00/76252 A1  12/2000

* cited by examiner

*Primary Examiner*—Rodney Bovernick
*Assistant Examiner*—Mike Stahl
(74) *Attorney, Agent, or Firm*—Finnegan, Henderson, Farabow, Garrett & Dunner, L.L.P.

(57) ABSTRACT

Optical switch matrix having at least an input matrix port defining at least a row of the matrix, a plurality of output matrix ports defining columns of the matrix, a plurality of switching elements, each one being disposed at the intersection of at least one row and one of the columns. Each switch element in a predetermined position of the matrix, in an activated condition, connects an input matrix port to an output matrix port, the ports being correspondents respectively to the predetermined position of the matrix.

13 Claims, 6 Drawing Sheets

OPTICAL SPACE-SWITCHING MATRIX

CROSS REFERENCE TO RELATED APPLICATIONS

This application is a national phase application based on PCT/EP01/13996, filed Nov. 30, 2001, the content of which is incorporated herein by reference.

BACKGROUND OF THE INVENTION

1. Field of the Invention

The present invention relates to an acousto-optical space-switching matrix. In particular the present invention relates to an optical spatial switching matrix comprising N input ports and M output ports, in which it is possible to switch an optical beam from any of the input ports to any of the output ports.

2. Description of the Related Art

Acousto-optical based switches have been proposed in the past.

U.S. Pat. No. 6,016,216 describes a polarization independent acousto-optic tunable filter (PIAOTF) used for multi-wavelength switching and routing in wavelength division multiplexing (WDM) networks. In the PIAOTF an incident unpolarized light beam is divided to propagate and to be diffracted along two polarization division branches. By using polarization converters and equal optical paths for the two polarization division channels, a PIAOTF is created which minimizes polarization dependent loss and polarization mode dispersion. Furthermore, a preferred embodiment of the AOTF using an elongated acousto-optic interaction medium is described that provides the additional advantages of narrow bandwidth, lower drive power and easier alignment.

U.S. Pat. No. 5,909,304 proposes an acousto-optic tunable filter based on an isotropic acousto-optic diffraction medium excited with an acoustic wave generated from a phased array transducer. Said acoustic-wave causes a diffraction of an incident light into said acousto-optic diffraction medium in a way to obtain a frequency of the diffracted light, which is narrower than the optical frequencies of said incident light.

U.S. Pat. No. 5,852,688 describes a method for optical energy transfer and energy guidance using an electric field to control energy propagation using a class of poled structures in solid material. The poled structures, which may form gratings in thin film or bulk configurations, may be combined with waveguide structures. Electric fields are applied to the poled structures to control routing of optical energy. Techniques include frequency-selective switchable and adjustable-tunable reflection, splitting, directional coupling, frequency-tunable switching and efficient beam combining, as well as polarized beam combining. Adjustable tunability is obtained by a poled structure, which produces a spatial gradient in a variable index of refraction along an axis in the presence of a variable electric field. In one embodiment, the patent describes a method of switching a grating which consists of a poled material with an alternating domain structure of specific period. When an electric field is applied across the periodic structure, a Bragg grating is formed by the electro-optic effect, reflecting optical radiation with a certain bandwidth around a center wavelength. The grating may be used by itself, or in combination with other gratings to form integrated structures in a ferroelectric crystal. Specifically of interest is a method of using an integrated structure in which one or more optical waveguides interact with one or more periodic structures to form a wavelength selective integrated optical switch.

U.S. Pat. No. 5,457,556 describes an optical cross-connect system in which incoming and outgoing fiber optic trunks carrying WTDM signals are terminated to first inlet ports and first outlet ports of an optical space switch. A wavelength division demultiplexer is connected to a second outlet port of the optical space switch and a wavelength division multiplexer is connected to a second inlet port of the optical space switch. A wavelength-divided space switch has first inlet ports connected to the outputs of the wavelength division demultiplexer and first outlet ports connected to the inputs of the wavelength division multiplexer. A time division demultiplexer is connected to a second outlet port of the wavelength-divided space switch and a time division multiplexer is connected to a second inlet port of the wavelength-divided space switch. The outputs of the time division demultiplexer are connected to first inlet ports of a time switch and the inputs of the time division multiplexer are connected to first outlet ports of the time switch. The time switch has second inlet ports and second outlet ports connected to a switched network U.S. Pat. No. 4,995,693 proposes an array of acousto-optic Bragg cells to couple one of a plurality of input light sources, or channels, to one out of a plurality of output terminals, or channels. By choice of the radio frequency tunable control, any of the inputs can be coupled to any of the outputs, by means of scan lenses.

SUMMARY OF THE INVENTION

Applicant has observed that the major disadvantage using acousto-optic Bragg cells is the dependence on the SOP of the efficiency of the switching process, since, the input geometry being kept fixed as radio frequency is tuned, in order to widen the diffraction angle on which the phase-matching condition can be reached up to a first order approximation, anisotropic diffraction must be employed. Moreover, a, since radio-frequency at about 100 MHz is used to allow acceptable diffraction efficiency, diffraction angles in the range of degree are obtained. In this maimer for minimizing the losses, for example the crosstalk between a channel and an adjacent channel, several centimeters of free-space propagation must be provided between the switching element and the output ports, resulting in the structure to be sensitive to thermo-mechanical perturbations.

Applicant has noted that said medium may change the state of polarization of the optical beam in relationship with said change of the frequency of the acoustic wave.

Applicant has tackled the problem of realizing a switching matrix architecture in which any commutation operation realized by means of acoustic waves is not dependent on the state of polarization of the optical beams and is not achieved by a change of frequency of said acoustic waves.

Applicant has found that if each switching element of a switching matrix performs the connection between one predetermined input port and one predetermined output port, each commutation can be activated if and only if a connection between said input and said output ports is required. This in principle minimizes energy consumption. In general, a M×N matrix can be considered, connecting M input ports to N output ports.

Applicant proposes a design for acousto-optic switching elements. Switching elements are designed so that when a switching element is active, a portion of the incident light beam is deflected preferably at 90 degrees with respect to the input beam. This 90-degree deflection if reached with a fixed frequency. Working at 90 degrees enable to keep a closely-packed architecture and to minimize the beam propagation necessary to obtain good channel rejection.

In dependence on the overall functional destination of the matrix, the percentage in power of the input beam to be switched can be adjusted by proper design of the switching component.

A first aspect of the present invention regards an optical switch matrix comprising:

at least an input matrix port defining at least a row of said matrix, a plurality of output matrix ports defining columns of said matrix, a plurality of switching element each one being disposed at the intersection of said at least one row and one of said columns, characterized in which each of said plurality of switch elements in a predetermined position of the matrix, in an activated condition, connects an input matrix port to an output matrix port, said ports being correspondents respectively to said predetermined position of the matrix, and each of said plurality of switch elements comprises an acousto-optic deflector to select one of said plurality output matrix port.

Preferably, for each switching element in said activated condition the matrix includes at least one further switching element inactive in the same matrix row and in a successive column.

Preferably, said matrix further comprising a substrate on which said switching element are provided and a plurality of waveguides in which the optical signals from input ports to switching elements and from switching elements to output ports are guided.

A further aspect of the present invention regards optical switch comprising:

at least one input port, a plurality of output ports, an acousto optic medium, a switching mechanism which activates said switch by generating acoustic waves in said acousto optic medium, characterized in that it comprises a semi-transparent interface which partially reflects and partially transmits an optical beam, said transmitted beam being sent from said at least one input port to one of said plurality of output ports, said reflected beam being diffracted from said acousto-optic medium when activated by said switching mechanism, from at least one input port to another one port of said plurality of output ports.

Said switch further comprising a first prism and a second prism, realized in an acousto-optic medium, bonded each other in a way to form said semi-transparent interface.

Preferably, said semi-transparent interface comprises at least an optical conductive medium.

Preferably, said acousto-optic diffraction medium is an isotropic acousto optic diffraction medium.

Preferably, said switching mechanism comprises a piezo electric transducer.

Preferably, said piezo electric transducer comprises a piezo-electric transducer plate.

Preferably, said piezo-electric transducer plate is bonded on the top of said second prism.

Preferably, said switch further comprising dark elements, having central holes disposed in correspondence of each one of said plurality of output ports.

BRIEF DESCRIPTION OF THE DRAWINGS

Further features and advantages of the present invention will appear more clearly from the following detailed description of a preferred embodiment, made with reference to the attached drawings. In such drawings.

DETAILED DESCRIPTION OF THE INVENTION

Figure 1:
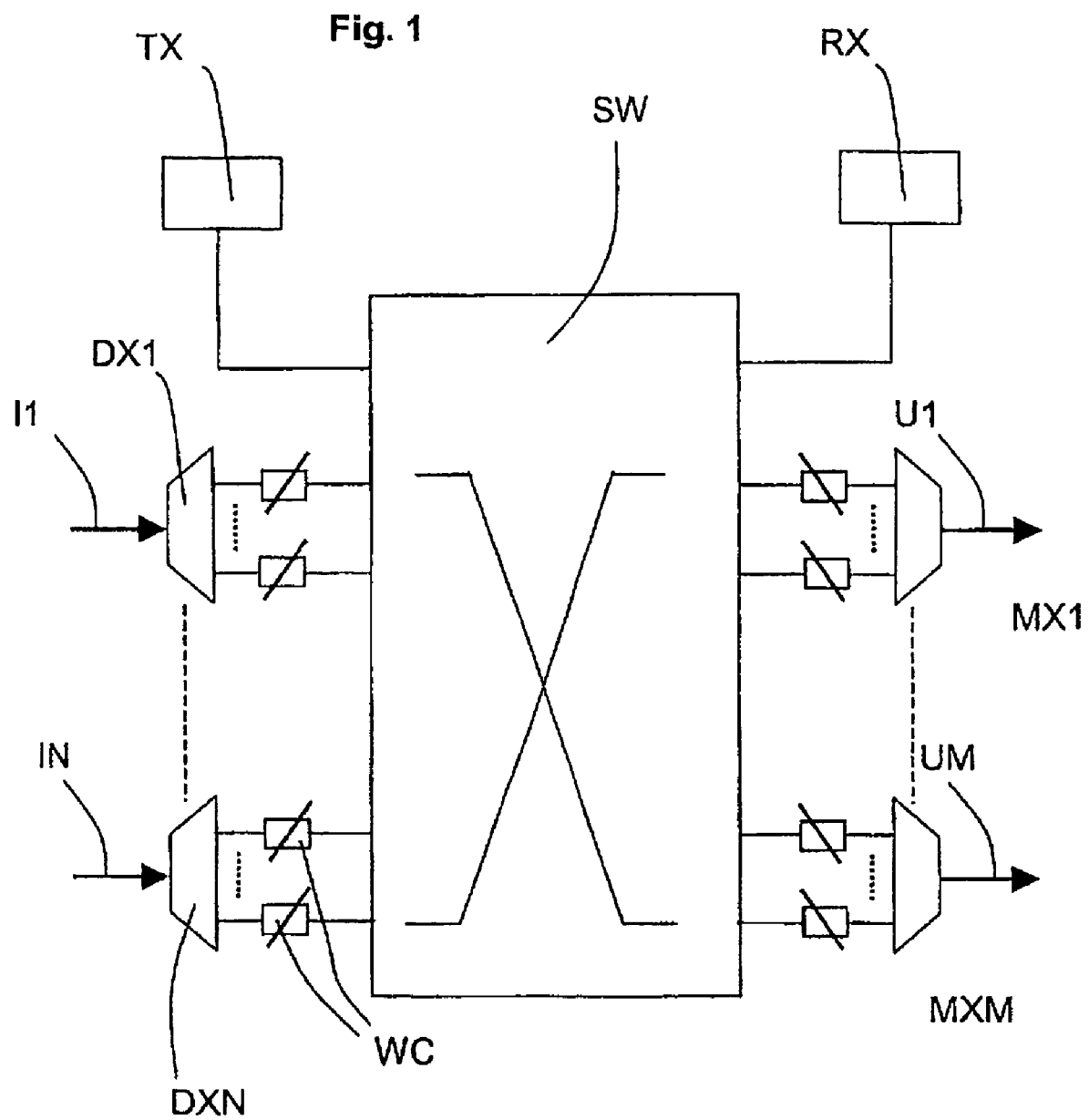
in FIG. 1 an Optical Cross Connect (OXC) architecture is shown.

In FIG. 1 an example of an optical cross connect (OXC) architecture is shown. Said OXC architecture comprises a plurality of input matrix ports I1 - - - IN, in which optical multi-wavelength signals are inputted, and a plurality of output matrix ports U1 - - - UM in which optical multi-wavelength signals are outputted. For example, each optical multi-wavelength signal may be a signal of a telecommunication line, and the entire set of optical multi-wavelength signals may be part of an optical network. Said optical cross connect (OXC) architecture may be part of a node of said network.

For optical multi-wavelength signal, or WDM optical signals, a plurality of mutually independent optical signals has to be sent along a line, comprising optical fibers or waveguides, by means of multiplexing in the optical wavelength domain; the transmitted signals can be either digital or analog, and they are distinguished from each other in that each of them has a specific wavelength, separate from that of the other signals.

To implement this WDM transmission along a line, specific wavelengths of predetermined amplitude, termed "channels" in the following text, have to be assigned to each of the signals at different wavelengths. These channels, each identified in the following text by a wavelength value, called the central channel wavelength, have a certain spectral amplitude around the central wavelength value, which depends, in particular, on the characteristics of the signal source laser and on the modulation imparted to this to associate a data element with the signal. Typical gaps between one channel and one other channel are 1.6 nm or 0.8 nm.

Preferably, in said node the OXC architecture performs routing functions of said optical multi-wavelength signals. In particular, said OXC architecture preferably comprises a plurality of demultiplexer devices DX1 - - - DXN, each one being connected with one of said plurality of input ports I1, IN and a plurality of multiplexer devices MX1 - - - MXM, each of one being connected with one of said plurality output matrix ports U1 - - - UN. Said demultiplexers separate the channels of said multi-wavelength signals and said multiplexers merge the separated channel with each other to re-form said multi-wavelength signals.

Said OXC architecture comprises a switching matrix SW, which performs predetermined routing of said channels. Preferably said OXC architecture comprises a plurality of wavelength converters WC inserted between the switching matrix and the multiplexer and/or between the switching matrix and the demultiplexer. Said wavelength converters WC are able to convert the wavelength of each channel in another one wavelength without losses of the information contained in each optical signal which travels in the corresponding channel.

If the network node comprises also an optical add-drop multiplexer (OADM), there can be also a portion of local traffic, which adds to the network and a portion of traffic, which is dropped from the OXC and is directed to local area networks. In FIG. 1, said local traffic added to the network is represented by a transmitter TX that inputs a channel into the switching matrix, and the traffic dropped to the network is represented by a receiver RX. What is described above is the OXC section devoted to routing of the transit traffic, which means that the OXC is used to connect network sub-sections as stated before.

Figure 2:
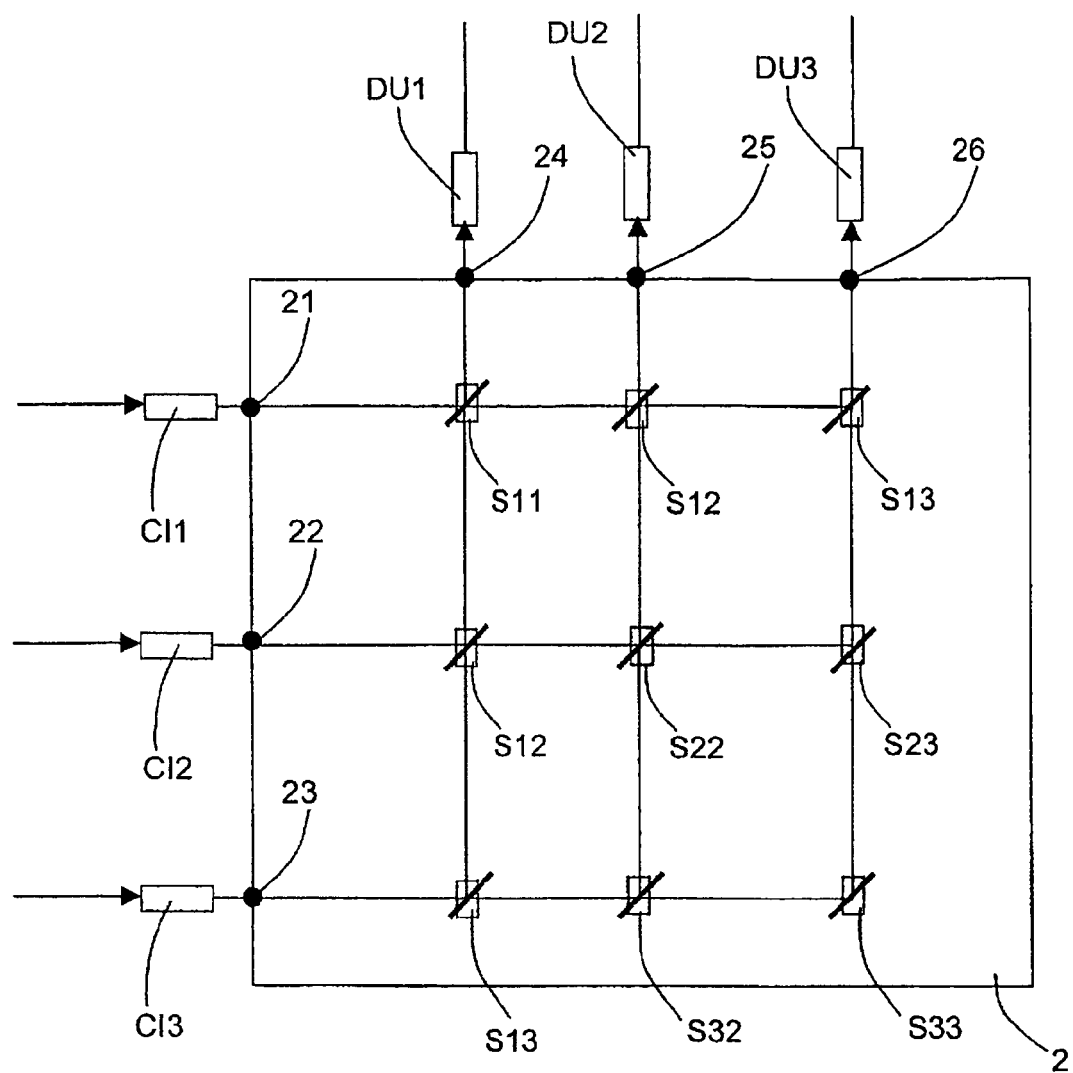
in FIG. 2 an architecture of a 3×3 switching matrix according to present invention is shown.

In FIG. 2 an optical spatial switching matrix, according to present invention is shown. In said figure the matrix is a 3×3 matrix; generally, the present invention relates to an optical spatial switching matrix N×M, in which N is the number of input ports (from 1 to M ports), and M is the number of output ports (from 2 to N ports). Said switching matrix comprises preferably a substrate 2 on which a plurality of switching elements S11, S12, S13, S21, S22, S23, S32, S31 and S33 are provided. On said substrate at least one input port (in FIG. 1 first 21 second 22 and third 24) and a plurality of output ports (in FIG. 1 first 24 second 25 and third 26) are provided.

Preferably, each input port defines a row of said matrix and each said output port defines a column of said matrix. Preferably, said switching elements are disposed at the intersections of said rows and columns. In general, a generic switching element $S_{ij}$ is disposed at the intersection of the row i with the column j.

At input ports, optical signals from external optical fibers or from external optical waveguides are collimated using collimators CI1, CI2 and CI3 or lenses or other equivalent devices. At output ports, optical signals from the switching matrix are focused using focusing devices DU1, DU2 and DU3.

Preferably, said substrate comprises a plurality of waveguides in which the optical signals are guided from input ports to switching elements and from switching elements to output ports.

Alternatively the optical signals may travel in free-space. The directions of the optical beams on the substrate can be chosen from the collimators or lenses CI1, CI2 and CI3. If on said substrate said waveguides are provided, said substrate is preferably made of an optical transmissive material, for example like Lithium Niobate. If the optical signals travel in free-space said substrate may be a simple plastic material or a metallic material, which has preferably a low thermal expansion coefficient, like a plastic material. An adapted plastic material is a plastic named MACOR®.

Said switching elements are disposed, as above described, like in a matrix with reference to the positions of said input ports and output ports. In particular:

switching element S11 connects first input matrix port 21 and first matrix output port 24, switching element S12 connects first input matrix port 21 and second output matrix port 25, switching element S13 connects first input matrix port 21 and third output matrix port 26, switching element S21 connects second input matrix port 22 and first output matrix port 24, switching element S22 connects second input matrix port 22 and second output matrix port 25, switching element S23 connects second input matrix port 22 and third output matrix port 26, switching element S31 connects third input matrix port 23 and first output matrix port 24, switching element S32 connects third input matrix port 23 and second output matrix port 25, switching element S33 connects third input matrix port 23 and third output matrix port 26.

Figures 3A, 3B:
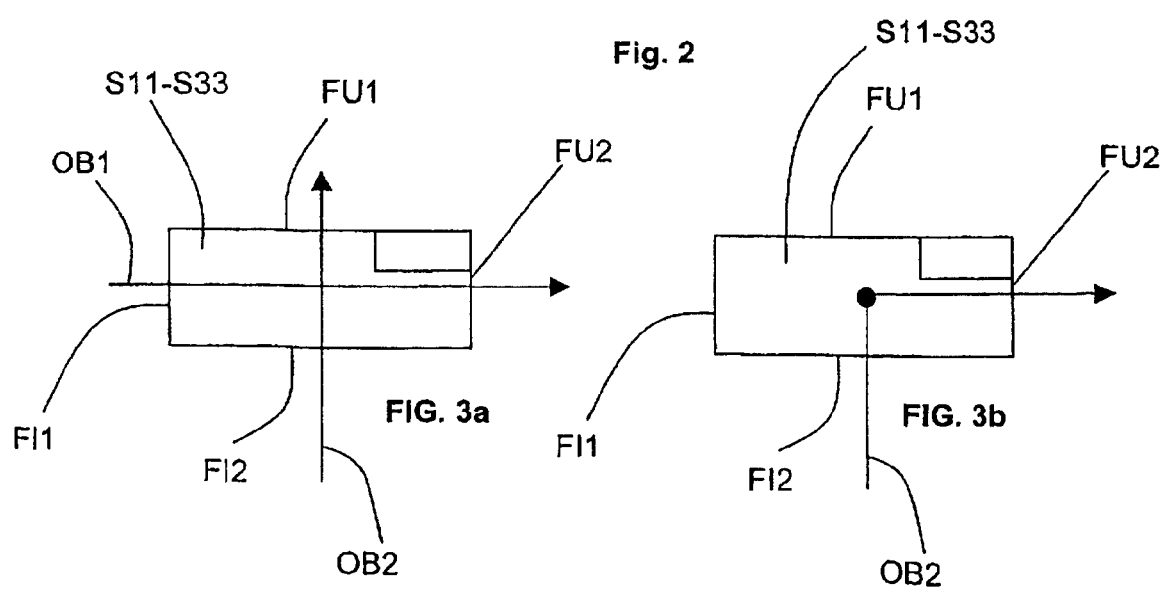
in FIG. 3a a schematical view of a switching element in an inactive condition according to present invention is shown.
in FIG. 3b a schematical view of a switching element in an active condition according to present invention is shown.

In FIGS. 3a and 3b a schematical view of a switching element is illustrated. In particular, said switching element has preferably a rectangular form and it comprises a first input face or port FI1, a second input face or port FI2 that is preferably orthogonal to said first input port FI1, a first output face or port FU1 that is in a opposite position with respect to said second input port FI2 and a second output face or port FU2 that is preferably orthogonal to said first output port FU1.

Said switching element has preferably two operative conditions.

An active "on" condition (FIG. 3b) in which a second input optical beam OB2 from said second input face FI2 exits from said second output face FU2.

An inactive "off" condition (FIG. 3a) in which a first input optical beam OB1 from said first input face FI1 exits from said second output face FU2 and a second input optical beam OB2 from said second input face FI2 exits from said first output face FU1.

In general, said switching element has at least a condition in which one of the two input beams is deviated from its entering direction on the input port and the other one optical beam is blocked, and another condition in which both the input optical beams cross the switching element without changing the original entering directions.

Said switching element further comprises a switching mechanism that performs the transitions between the two conditions. In particular, from an "on" condition to an "off" condition and vice versa.

The switching mechanism is preferably activated by means of an external control, for example an electrical signal, as will be described later. The switching matrix of present invention has no movable parts to obtain a switching action; the activation of a switching element is obtained by means of acoustic-waves.

The above-described switching matrix operates as follow. In the example of FIG. 2 the matrix is a 3×3 in which from any of the three input ports it is possible to route an optical signal to any of the three output ports. For example, for routing an optical signal from the first input port 21 to the third output port 26 only the switching element S13 is activated into the condition "on". The other entire switching elements may be in the condition "off". Generally, for routing an optical signal form a generic input port i to a generic output port j, the switching mechanism and the external control activate into the condition "on" the switching element $S_{ij}$ of the matrix. Each switch element in a predetermined position of the matrix, in an activated condition, connects an input port to an output port, said ports corresponding respectively to said predetermined position of the matrix.

Said switching element comprises an acousto-optic medium or deflector. An acousto-optic medium generally comprises a transparent elasto-optic medium to which an acousto transducer is associated, so as to generate optical acoustic waves, which propagate within the medium. Said acoustic-optic medium is preferably an isotropic acousto-optic medium. More preferably said medium is a $TeO_2$ (tellurium oxide) based glass.

For $TeO_2$ (tellurium oxide) based glass is intended a glass made of several chemical components, of which TeO2 is the principal.

Said acousto transducer is for example a piezoelectric transducer plate bonded to said acousto-optic medium.

$TeO_2$ based glass of an example shows a figure of merit for acousto-optic effect:

$$M_2 = n^6 p^2 / \rho v^3_{AC} = 23.9 \times 10^{-15} \ [s^3/kg],$$

where n is the refractive index, p is the elastic-optic coefficient, p is the density of the material and $v_{AC}$ is the sound velocity in the medium.

Other examples of acousto-optic glasses are flint glasses and extra dens flint glasses. The piezoelectric transducer is preferably a thin plate of quartz ($SiO_2$) or Lithium niobate ($LiNbO_3$). The transducer launches an acoustic wave along an acoustic wave vector $K_{AC}$, which is preferably normal to a transducer face.

A radio-frequency signal is applied to the transducer, so that $$K_{AC} = 2w/\Lambda = 2\pi f/v_{AC},$$

where $\Lambda$ is the spatial period of the acoustic wave, f is the radio frequency. The presence of an acoustic wave in the medium causes a portion of an incident optical beam to be diffracted.

Figure 5:
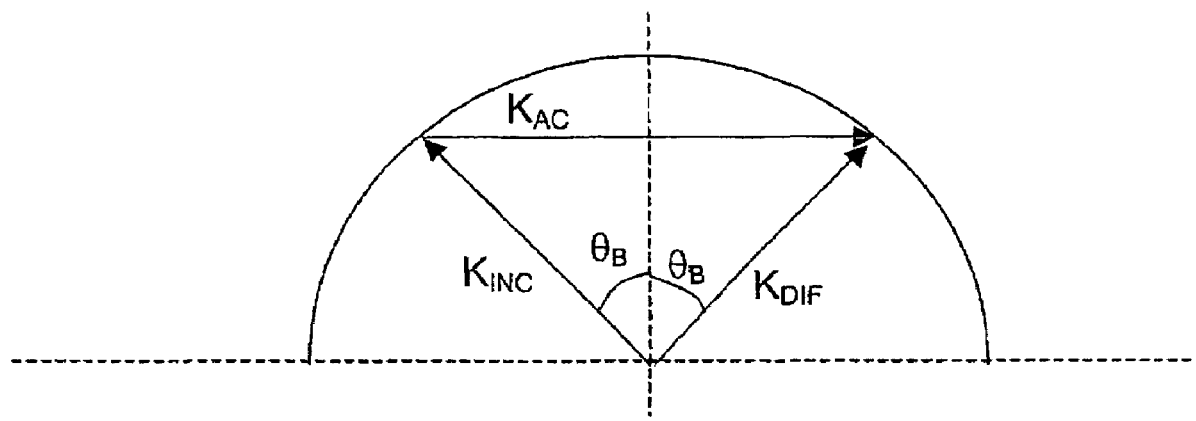
in FIG. 5 a scheme of diffraction in an acousto optic medium of an optical beam is shown.

Referring to FIG. 5, for efficient acousto optic diffraction to take place, the momentum matching condition must be satisfied, i.e.:

$$K_{DIF} = K_{INC} + K_{AC};$$

Where $K_{DIF}$ is the vector of the diffracted optical beam and $K_{INC}$ is the vector of the incident optical beam.

For diffraction in isotropic materials, this relation leads to the Bragg condition $$\sin \theta = \lambda/2\pi\Lambda = 2f/2nv_{AC};$$

where diffraction angle $\theta_B$ is defined as in FIG. 5, n is the index of refraction of the isotropic material, $\lambda$ is the optical wavelength in vacuum.

The diffraction efficiency for the AO effect $\eta$ is defined as the ratio between the intensity of the diffracted optical beam $I_1$ and the intensity of the incident optical beam $I_0$.

$$\eta = \frac{I_1(L)}{I_0(0)} = \sin^2\left[\frac{\pi}{\lambda_o \cos\theta_B}\left(\frac{M_2 L}{2W} P_a\right)^{1/2}\right],$$

where L and W represent respectively the length and width of the piezo-electric transducer, $\lambda_o$ is the optical wavelength of the incident beam, $\theta_B$ is the Bragg angle and $P_a$ is the acoustic power delivered by the transducer. As $M_2$ increases, the acoustic power $P_a$ required to reach a predetermined diffraction efficiency decreases. In turn, $P_a$ depends on the electrical power delivered to the transducer. Therefore as $M_2$ increases, less electrical power is required to reach the same diffraction efficiency.

Among amorphous materials, a good material is one in which a trade-off is found among the following requirements:

elevated M2, low acoustic absorption coefficient, high thermal stability regarding acoustic and optical properties, chemical and mechanical stability, elevated optical transparency and low chromatic optical dispersion at the wavelength of interest (for example around 1.500 nm).

In particular, elevated $M_2$ means that $M_2$ is at least one order of magnitude greater than $M_2$ for fused Silica (which is $1.51 \times 10^{-15}$ $s^3 kg^{-1}$ at a $\lambda o = 633$ nm). This enables to reach 100% diffraction efficiency with $P_e < 10$ W at $\lambda o = 1.5$ μm, while requiring L to be in the centimeter range.

In particular, low optical chromatic dispersion means that the magnitude of the dispersion be of the same order of magnitude of silica optical fibers (D≅17 ps/nm Km at 1550 nm in $SiO_2$ fibers). In the present case $TeO_2$-based glasses typically show a dispersion in the range of D=−35 ps/nm Km.

One example of $TeO_2$ (tellurium oxide) based glass is the following composition:

$TeO_2$(62,5% wt.), $WO_3$(32.36% wt.), MgO (0.55% wt.), $Li_2O$ (2.42% wt.), $TiO_2$ (2.17% wt.).

$TeO_2$ is the main component and it contributes to high refractive index, low acoustic velocity, low acoustic absorption, optical transparency and low chromatic dispersion; $WO_3$ has been introduced in such a percentage, so as to contribute to an increase in the refractive index, without affecting other parameters; MgO is added in such a percentage in order to reduce the density of the glass, without increasing the acoustic velocity; $Li_2O$ and $TiO_2$ help the glass to vetrify; in addition $TiO_2$ increases the refractive index.

The switching mechanism comprises said acousto-optic transducer which provides the commutation between a condition "on" and a condition "off" and vice versa. The above cited external control is preferably the radio frequency applied to said acousto-optic transducer.

Figure 4:
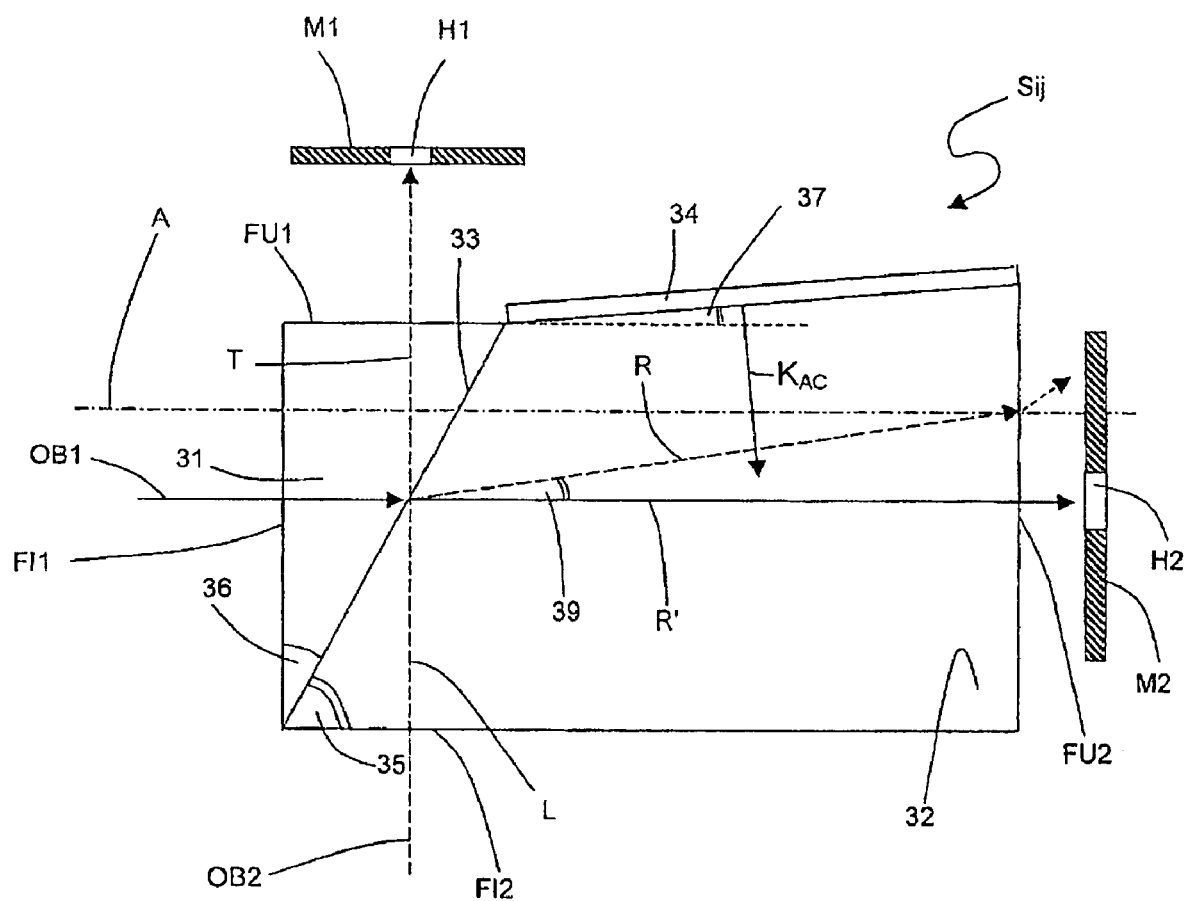
in FIG. 4 an example of a structure of a switching element, in a lateral view according to present invention is shown.

In FIG. 4 an example of a generic switching element $S_{ij}$ is shown. In particular, said switching element comprises a first prism 31 and a second prism 32, the two prisms are bonded each other in a way to from a semi-transparent interface 33.

Advantageously the semitransparent interface comprises at least a layer of an optical conductive medium, for example a thin layer of Au.

Preferably, the two prisms are bonded each other by means of glue. Said glue is preferably also an optical conductive medium.

Said semi-transparent interface forms substantially a beam splitter in which an incident optical beam is partially transmitted and partially reflected. A splitter angle 35 is defined by the geometry of the two prisms and it represents the angle between the direction of said transparent interface and the side face of corresponding prism 32 input face FI2. Such angle determines the direction of the reflected beam of the semitransparent interface.

Preferably, said semi-transparent interface comprises at least a layer of conductive optical medium. More preferably, said semi-transparent interface comprises at least a layer of glue. Preferably, said conductive optical medium and said glue are selected to form a dielectric multistrate substantially insensitive to the polarization of an optical beam. Said semi-transparent interface partially transmits and partially reflects an optical beam without distinguishing between polarizations status. Preferably, the percentage of transmitted beam is chosen around 50%. But for special purposes the percentage of transmitted beam may be chosen with a different percentage; for example in a matrix, in which in said predetermined positions the commutations are more probable, it is advantageous to choose a lower percentage for the transmitted beam, for example 30%.

One example of semitransparent interface insensitive at the polarization can be composed of 5 layers, so that an optical beam crosses in the order: first layer of $TiO_2$, of thickness t1=308 nm and refractive index n1=2.2, second layer of Si, of thickness t1=310 nm and refractive index n2=3.52, third layer of $TiO_2$, of thickness t3=310 nm and refractive index n3=2.2, fourth layer of $MgF_2$, of thickness t4=348 nm and refractive index n4=1.38, fifth layer of $TiO_2$, of thickness t5=348 nm and refractive index n5=2.2.

On the top of the second prism 32 a piezo-electric transducer plate 34 is provided. When said transducer is fed with adequate electric current it generates acoustic waves which propagates into said second prism into the direction $K_{AC}$ which is preferably perpendicular to the plane of the transducer plate. Said plane of the transducer plate has preferably a plane angle 37, which is the angle between the direction of the plane of the transducer and parallel to input face FI2. Said plane angle is chosen in a way to form acoustic waves with a predetermined direction into the acoustic optic medium as detailed in the following As above described said switching element comprises a first input face or port FI1 a second input face or port FI2 a first output face or port FU1 and a second output face or port FU2. Moreover, said switching element comprises a first dark element M1, having a central hole H1 disposed in correspondence of said first output port and a second dark element M2, having a central hole H2, disposed in correspondence of said second output port. Said two dark elements transmit an optical beam directed into said holes and stop an optical beam directed in the other directions. Said dark elements are preferably metallic plates on which black layers are deposited.

Both in presence of an acoustic wave, generated from said piezoelectric plate, or not, a first input beam OB1 entering from the first input port FI1 is transmitted to the second output port FU2. A second input beam OB2 entering from the second input port FI2 is partially reflected substantially to said second output port and partially transmitted to said first output port FU1. In particular, if the transducer is in "off" condition the reflected beam R is directed to the second output FU2 with an angulated direction with respect to the axis A. Said angle depends from the chosen splitting angle 35. Preferably, said splitting angle is chosen in a way to direct said reflected beam R to said second dark element not in correspondence of the hole H2. In this way, the reflected optical beam is stopped from said second dark element M2.

If the transducer is in "on" condition the acousto-optic diffraction medium is excited from the acoustic wave emitted from said piezoelectric plate. This wave causes a diffraction of the reflected optical beam and causes a change of the direction of propagation of the reflected optical beam. The diffraction optical beam angle changes in relationship with the frequency of said acoustic wave. Said frequency is chosen in a way to form a diffraction angle 39 which determines a diffracted optical beam R' preferably parallel to said axis A. Generally the diffraction angle 39 is chosen in a way to direct the diffracted optical beam R' to the hole H2 of said dark element M2. In this way when the switching element is in "on" condition an optical beam from said second input port FI2 is directed to said second output port.

For example in the matrix of FIG. 2, to switch a signal from the third matrix input port 23 to the first matrix output port 24 the switching element S13 is activated into the "on" condition. Said switching element into the "on" condition transmits partially the optical beam to said first output port FU1 (see FIG. 4). Said potential crosstalk beam is stopped from the successive switch element S32 which is certainly in an off condition (to connect a input matrix port i to a output matrix port j only the Sij element is activated into the "on" condition). Generally, the matrix is designed in a way to stop the crosstalk of a partially transmitted optical beam of an "on" switch element, from another one switch element in the same row, which is certainly in the "off" condition. Each switching element in said activated condition has at least one further switching element inactive in the same matrix row and in a successive column. No crosstalk arises due to beams partially transmitted from a switching element in the last column, i.e. the column opposite to the inputs 21–23 in FIG. 2.

Figure 6A:
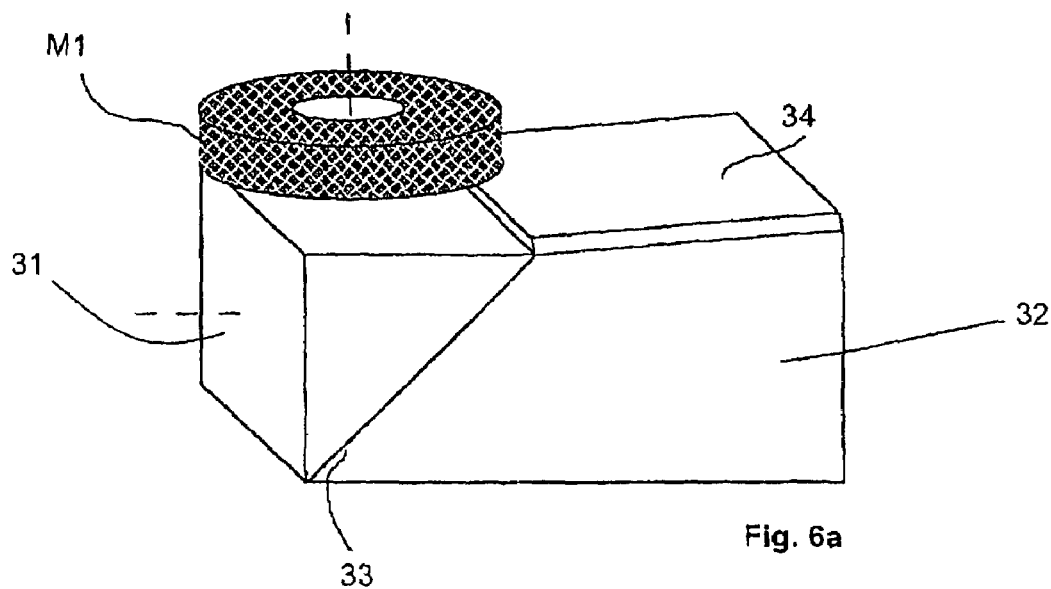
in FIG. 6a and FIG. 6b an example of a switching element in a three-dimensional view is shown.
Figure 6B:
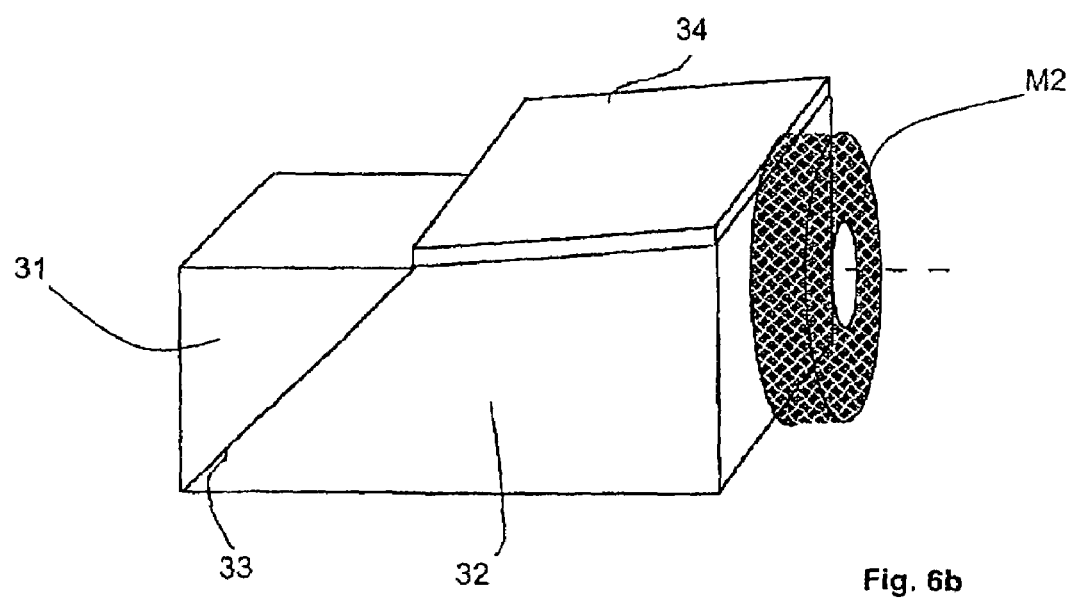

In FIG. 6a and 6b an example of a switching element is shown. In particular, in such example the two prisms are realized in $TeO_2$, the partially-reflecting layer is made of a 6.45 nm-thick Au layer, resulting in a 50% reflection of the s-polarized component and a 98% reflection of the p-polarization component of the optical beam. The dependence on the polarization is a function of the incidence angle of the beams.

The splitting angle 35 is around 45.5° and the plane angle 37 is around 0.5°. The frequency of the acoustic wave is chosen around 80 MHz. The transducer 34 is a thin plate of quartz ($SiO_2$).

Figure 7:
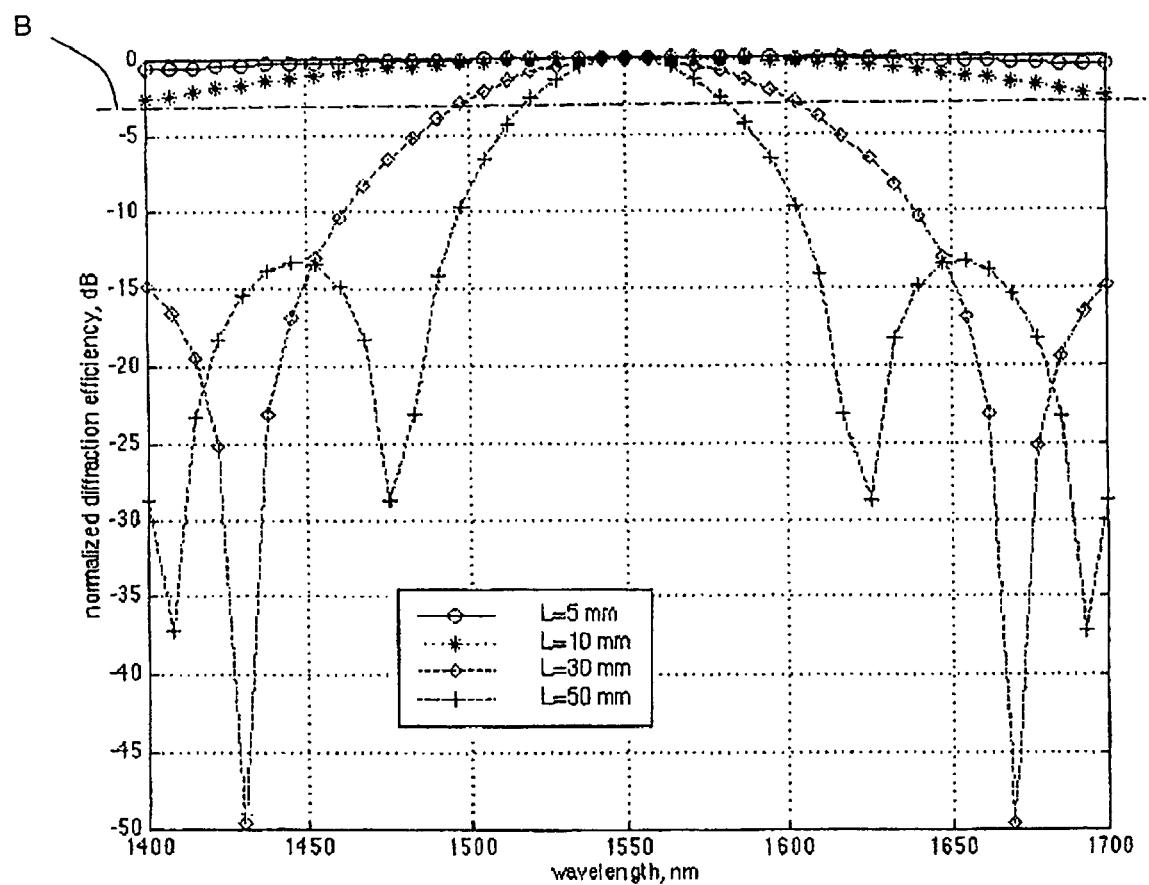
in FIG. 7 a graph of spectral responses of a switching element is shown.

Said optical switching matrix as above described is designed preferably to use in an optical network with multiwavelength signals. For this reason the switching elements of invention must be substantially insensitive at the wavelengths; in particular, the switching elements of the invention must be substantially insensitive at the wavelength preferably into the amplification band of optical amplifiers contained in such network. In FIG. 7 a spectral response of the switching element of FIG. 6a and 6b is shown. The optical band is centered to a wavelength of 1550 nm, which is a typical wavelength value for a channel of a multiwavelength signal of optical networks. In particular, the graph of FIG. 7 shows four curves, which are referred to different length of said transducer of FIGS. 6a and 6b. Each curve is referred to a predetermined length of the transducer.

From the curves is has to be noted that the −3 dB wavelength band (identified in FIG. 7 with the line B), which is a typical value of acceptable losses in a network band, is for example around 300 nm for a length of L of 10 millimeter. Said band is sufficient to cover an entire set of channels of a multi-wavelength signal in a dense multiwavelength system.

What is claimed is:

1. An optical switch matrix comprising:
at least an input matrix port defining at least a row of said matrix;
a plurality of output matrix ports defining columns of said matrix; and
a plurality of switching elements each one being disposed at the intersection of said at least one row and one of said columns, each of said plurality of switching elements in a predetermined position of the matrix, in an activated condition, connects an input matrix port to an output matrix port, said ports being correspondent respectively to said predetermined position of the matrix, and each of said plurality of switching elements comprises an acousto-optic deflector to select one of said plurality of output matrix ports,
wherein the acousto-optic deflector comprises an acousto-optic medium comprising a semi-transparent interface adapted to receive an optical beam and to reflect a first portion of the beam and transmit a second portion of the beam.

2. The optical switch matrix according to claim 1, wherein for each switching element in said activated condition, the matrix includes at least one further switching element inactive in the same matrix row and in a successive column.

3. The optical switch matrix according to claim 1, further comprising a substrate on which said switching elements are provided and a plurality of waveguides in which the optical signals from input ports to switching elements and from switching elements to output ports are guided.

4. An optical switch comprising:
at least one input port;
a plurality of output ports;
an acousto-optic medium; and
a switching mechanism which activates said switch by generating bulk acoustic waves within said acousto-optic medium,
the acousto-optic medium comprising a semi-transparent interface adapted to receive an optical beam and which reflects a first portion of the beam and transmits a second portion of the beam, said transmitted portion of the beam being sent from said at least one input port to one of said plurality of output ports, said reflected portion of the beam being diffracted from said acousto-optic medium when activated by said switching mechanism, from at least one input port to another one port of said plurality of output ports.

5. The optical switch according to claim 4 further comprising:
a first prism and a second prism, realized in the acousto-optic medium, bonded to each other in a way to form said semi-transparent interface.

6. The optical switch according to claim 4 wherein said semi-transparent interface comprises at least an optical conductive medium.

7. The optical switch according to claim 4 wherein said acousto-optic medium is an isotropic acousto-optic diffraction medium.

8. The optical switch according to claim 4, wherein said switching mechanism comprises a piezo-electric transducer.

9. The optical switch according to claim 8 in which said piezo electric transducer comprises a piezo-electric transducer plate.

10. The optical switch according to claim 9:
further comprising a first prism and a second prism, realized in the acousto-optic medium and bonded to each other so as to form said semi-transparent interface and;
wherein said piezo-electric transducer plate is bonded on the top of said second prism.

11. The optical switch according to claim 4, further comprising dark elements, having central holes disposed in correspondence of each one of said plurality of output ports.

12. The optical switch matrix according to claim 1, wherein each of said plurality of switching elements further comprises:
at least one input port;
a plurality of output ports;
a switching mechanism which activates said switching element by generating acoustic waves within said acousto-optic medium,
wherein the portion of the optical beam transmitted by the semi-transparent surface is sent from said at least one input port to one of said plurality of output ports, and the portion of the optical beam reflected by the semi-transparent surface is diffracted from said acousto-optic medium when activated by said switching mechanism, from said at least one input port to another one port of said plurality of output ports.

13. The optical switch matrix according to claim 1, wherein said semi-transparent surface is substantially insensitive to the polarization of the optical beam.

* * * * *